US010677071B2

(12) United States Patent
Arisi et al.

(10) Patent No.: US 10,677,071 B2
(45) Date of Patent: Jun. 9, 2020

(54) TURBINE VANE FOR GAS TURBINE ENGINE

(71) Applicant: United Technologies Corporation, Farmington, CT (US)

(72) Inventors: Allan N. Arisi, Manchester, CT (US); Bret M. Teller, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 15/957,255

(22) Filed: Apr. 19, 2018

(65) Prior Publication Data
US 2019/0323362 A1    Oct. 24, 2019

(51) Int. Cl.
*F01D 25/12* (2006.01)
*F01D 5/18* (2006.01)
*F01D 9/04* (2006.01)

(52) U.S. Cl.
CPC ............. *F01D 5/189* (2013.01); *F01D 9/041* (2013.01); *F01D 25/12* (2013.01); *F05D 2220/323* (2013.01); *F05D 2230/54* (2013.01); *F05D 2230/60* (2013.01); *F05D 2240/121* (2013.01); *F05D 2250/74* (2013.01); *F05D 2260/201* (2013.01); *F05D 2260/202* (2013.01)

(58) Field of Classification Search
None
See application file for complete search history.

(56) References Cited

U.S. PATENT DOCUMENTS

| | | | |
|---|---|---|---|
| 5,207,556 A | 5/1993 | Frederick et al. | |
| 6,065,928 A * | 5/2000 | Rieck, Jr. ................ | F01D 5/189 |
| | | | 415/115 |
| RE39,479 E | 1/2007 | Tressler et al. | |
| 7,921,654 B1 | 4/2011 | Liang | |
| 10,156,147 B2 * | 12/2018 | Waite ...................... | F01D 5/189 |
| 2003/0068222 A1 * | 4/2003 | Cunha ...................... | F01D 5/18 |
| | | | 415/115 |
| 2009/0246023 A1 * | 10/2009 | Chon ...................... | F01D 5/188 |
| | | | 416/95 |
| 2010/0124485 A1 * | 5/2010 | Tibbott ................... | F01D 5/188 |
| | | | 415/115 |
| 2015/0027657 A1 * | 1/2015 | Propheter-Hinckley ..................... | |
| | | | B22C 9/04 |
| | | | 164/519 |
| 2017/0175551 A1 * | 6/2017 | Waite ...................... | F01D 5/189 |

(Continued)

*Primary Examiner* — Michael Lebentritt
(74) *Attorney, Agent, or Firm* — Cantor Colburn LLP (57) ABSTRACT

A turbine vane for a gas turbine engine having a plurality of cooling holes defined therein, at least some of the plurality of cooling holes being located on a leading edge of an airfoil of the turbine vane and in fluid communication with an internal cavity of the turbine vane; and a baffle insert located in the internal cavity, the baffle insert having a plurality of holes formed therein at least some of the plurality of holes of the baffle insert corresponding to the at least some of the plurality of cooling holes located in the leading edge of the turbine vane, the baffle insert being formed from a flat sheet of metal wherein the plurality of holes of the baffle insert are formed in the flat sheet of metal prior to the baffle insert being formed from the flat sheet of metal, the plurality of holes of the baffle insert being formed in the flat sheet of metal according to the coordinates of Table 1.

20 Claims, 6 Drawing Sheets

(56) References Cited

U.S. PATENT DOCUMENTS

| | | | |
|---|---|---|---|
| 2017/0175578 A1* | 6/2017 | Propheter-Hinckley | ................... F01D 9/02 |
| 2017/0234151 A1* | 8/2017 | Spangler | ................ F01D 5/188 415/115 |
| 2018/0135431 A1* | 5/2018 | Propheter-Hinckley | ................... F01D 5/188 |
| 2019/0218932 A1* | 7/2019 | Mongillo, Jr. | .......... F01D 25/12 |

* cited by examiner

TURBINE VANE FOR GAS TURBINE ENGINE

BACKGROUND

Exemplary embodiments of the present disclosure relate generally to a vane for a gas turbine engine and, in one embodiment, to a cooling hole distribution for a baffle suited for use in vanes of a turbine section of the gas turbine engine.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Both the compressor and turbine sections include rotating blades alternating between stationary vanes. The vanes and rotating blades in the turbine section extend into the flow path of the high-energy exhaust gas flow. All structures within the exhaust gas flow path are exposed to extreme temperatures. A cooling air flow is therefore utilized over some structures to improve durability and performance.

In some instances the leading edge of the vane is subjected to high static-to-total pressure ratios. Accordingly, it is desirable to minimize cooling air pressure losses in a vane of a gas turbine engine.

BRIEF DESCRIPTION

Disclosed herein is a turbine vane for a gas turbine engine having a plurality of cooling holes defined therein, at least some of the plurality of cooling holes being located on a leading edge of an airfoil of the turbine vane and in fluid communication with an internal cavity of the turbine vane; and a baffle insert located in the internal cavity, the baffle insert having a plurality of holes formed therein at least some of the plurality of holes of the baffle insert corresponding to the at least some of the plurality of cooling holes located in the leading edge of the turbine vane, the baffle insert being formed from a flat sheet of metal wherein the plurality of holes of the baffle insert are formed in the flat sheet of metal prior to the baffle insert being formed from the flat sheet of metal, the plurality of holes of the baffle insert being formed in the flat sheet of metal according to the coordinates of Table 1.

In addition to one or more of the features described above, or as an alternative to any of the foregoing embodiments, the turbine vane is a first stage turbine vane of a high pressure turbine of the gas turbine engine.

In addition to one or more of the features described above, or as an alternative to any of the foregoing embodiments, the at least some of the plurality of holes of the baffle insert corresponding to the at least some of the plurality of cooling holes located in the leading edge of the turbine vane have a hole diameter in a range of 0.015 inches to 0.030 inches.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

In addition to one or more of the features described above, or as an alternative to any of the foregoing embodiments, the at least some of the plurality of holes of the baffle insert corresponding to the at least some of the plurality of cooling holes located in the leading edge of the turbine vane have a hole diameter in a range of 0.015 inches to 0.030 inches.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

Also disclosed is a turbine stator assembly for a gas turbine engine. The turbine stator assembly having a plurality of vanes, each vane having a plurality of cooling holes defined therein, at least some of the plurality of cooling holes of each of the plurality of vanes being located on a leading edge of an airfoil of each of the plurality of vanes and in fluid communication with an internal cavity of a respective one of the plurality of vanes; and a baffle insert located in the internal cavity of each of the plurality of vanes, the baffle insert having a plurality of holes formed therein, at least some of the plurality of holes of the baffle insert corresponding to the at least some of the plurality of cooling holes located in the leading edge of a respective one of each of the plurality of vanes, the baffle insert being formed from a flat sheet of metal wherein the plurality of holes of the baffle insert are formed in the flat sheet of metal prior to the baffle insert being formed from the flat sheet of metal, the plurality of holes of the baffle insert being formed in the flat sheet of metal according to the coordinates of Table 1.

In addition to one or more of the features described above, or as an alternative to any of the foregoing embodiments, each vane of the plurality of vanes is a first stage vane of a high pressure turbine of the gas turbine engine.

In addition to one or more of the features described above, or as an alternative to any of the foregoing embodiments, the at least some of the plurality of holes of the baffle insert corresponding to the at least some of the plurality of cooling holes located in the leading edge of a respective one of the plurality of vanes have a hole diameter in a range of 0.015 inches to 0.030 inches.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of each vane of the plurality of vanes have a hole diameter that is less than the hole diameter of the at least some of the plurality of holes of the baffle insert corresponding to the at least some of the plurality of cooling holes located in the leading edge of the turbine vane.

In addition to one or more of the features described above, or as an alternative to any of the foregoing embodiments, the at least some of the plurality of holes of the baffle insert corresponding to the at least some of the plurality of cooling holes located in the leading edge of a respective one of the plurality of vanes have a hole diameter in a range of 0.015 inches to 0.030 inches.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of a respective one of the plurality of vanes have a hole diameter that is less than the hole diameter of the at least some of the plurality of holes of the baffle insert corresponding to the at least some of the plurality of cooling holes located in the leading edge of the turbine vane.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of a respective one of the plurality of vanes have a hole diameter that is less than the hole diameter of the at least some of the plurality of holes of the baffle insert corresponding to the at least some of the plurality of cooling holes located in the leading edge of the turbine vane.

Also disclosed is a method of cooling a leading edge of a turbine vane of a gas turbine engine. The method including the steps of: forming a plurality of cooling holes in the turbine vane, at least some of the plurality of cooling holes being located on a leading edge of an airfoil of the turbine vane and in fluid communication with an internal cavity of the turbine vane; forming a baffle insert from a flat sheet of metal wherein a plurality of holes are formed in the flat sheet of metal prior to the baffle insert being formed from the flat sheet of metal, the plurality of holes of the baffle insert being formed in the flat sheet of metal according to the coordinates of Table 1; and inserting the formed baffle insert into the internal cavity of the turbine vane.

In addition to one or more of the features described above, or as an alternative to any of the foregoing embodiments, at least some of the plurality of holes of the baffle insert correspond to the at least some of the plurality of cooling holes located in the leading edge of the turbine vane.

In addition to one or more of the features described above, or as an alternative to any of the foregoing embodiments, the turbine vane is a first stage vane of a high pressure turbine of the gas turbine engine.

In addition to one or more of the features described above, or as an alternative to any of the foregoing embodiments, the at least some of the plurality of holes of the baffle insert corresponding to the at least some of the plurality of cooling holes located in the leading edge of the turbine vane have a hole diameter in a range of 0.015 inches to 0.030 inches.

In addition to one or more of the features described above, or as an alternative to any of the foregoing embodiments, the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

In addition to one or more of the features described above, or as an alternative to any of the foregoing embodiments, the turbine vane is a first stage vane of a high pressure turbine of the gas turbine engine, and wherein all of the plurality of holes of the baffle insert have a hole diameter in the range of 0.015 inches to 0.030 inches.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
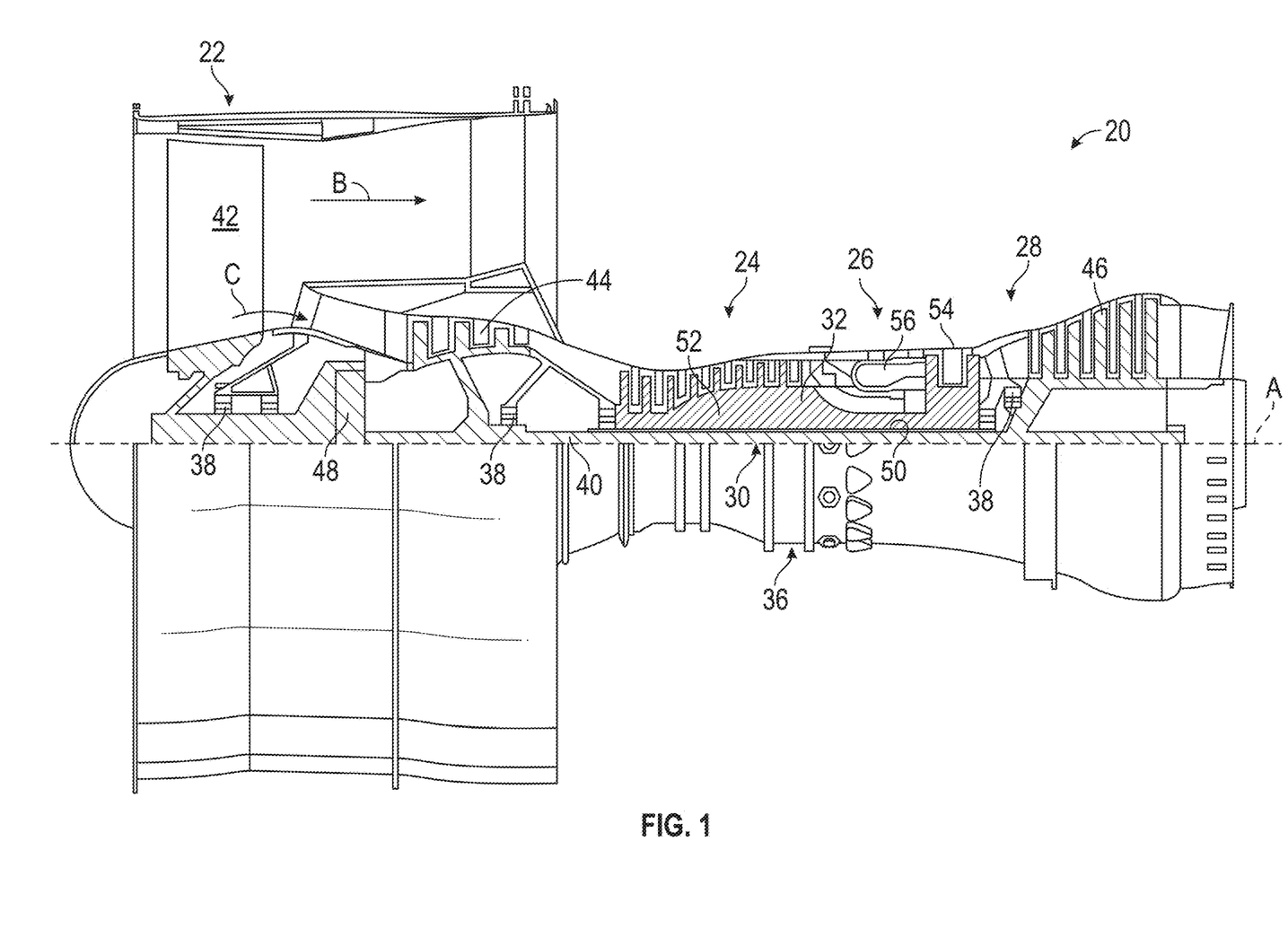
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
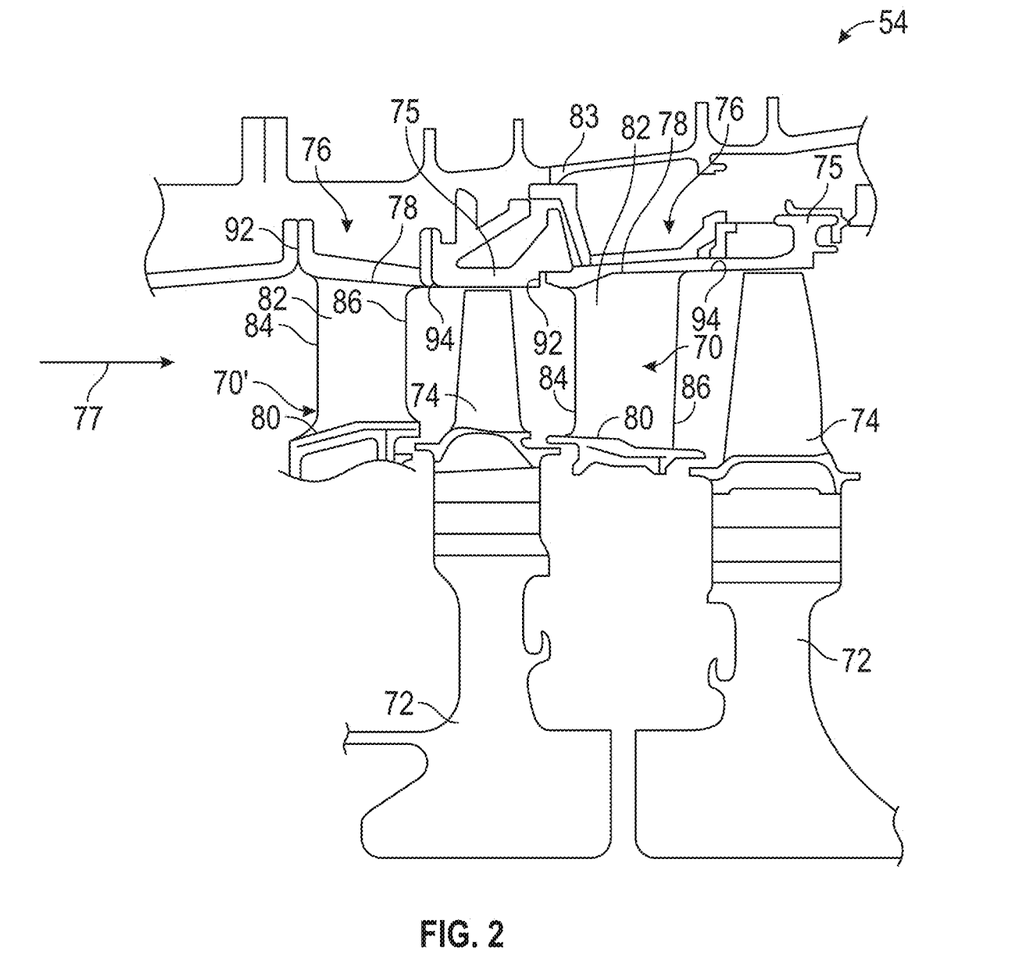
FIG. 2 is a schematic view of a two-stage high pressure turbine of the gas turbine engine.

FIG. 2 illustrates a portion of a high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to a blade outer air seal (BOAS) 75 which is located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, a blade outer air seal (BOAS) 75 is disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 56 flow through the turbine in the direction of arrow 77. Although a two-stage high pressure turbine is illustrated other high pressure turbines are considered to be within the scope of various embodiments of the present disclosure.

The high pressure turbine (HPT) 1st vane 70' is subjected to gas temperatures well above the yield capability of its material. In order to mitigate such high temperature detrimental effects, surface film-cooling is typically used to cool the vanes of the high pressure turbine. Surface film-cooling is achieved by supplying cooling air from the cold backside through cooling holes drilled on the high pressure turbine components. Cooling holes are strategically designed and placed on the vane and turbine components in-order to maximize the cooling effectiveness and minimize the efficiency penalty.

Referring now to at least FIGS. 2-5, each vane 70 (second stage vane 70 or first stage vane 70') has an upper platform or outer diameter platform 78 and a lower platform or lower diameter platform 80 with an airfoil 82 extending therebetween. When secured to an outer housing or turbine case 83 of the engine 20, the upper platform 78 is further away from axis A than the lower platform 80. In other words, the upper platform or outer diameter platform 78 is at a further radial distance from the axis A than the lower platform or inner diameter platform 80.

The airfoil 82 has a leading edge 84 and a trailing edge 86. In addition, the airfoil 82 is provided with an internal cavity or cavities 85 that is/are in fluid communication with a source of cooling air or fluid. The airfoil 82 has a plurality of cooling openings 88 that are in fluid communication with the internal cavity in order to provide a source of cooling fluid or air to portions of the airfoil 82 such that film cooling can be provided in desired locations.

In addition, the upper platform 78 is also provided with a plurality of cooling openings 88 that are also in fluid communication with a source of cooling fluid or air, which in one embodiment may be provided by an internal cavity of the platform that is in fluid communication with the source of cooling air or fluid.

In accordance with one embodiment, the second stage vane 70 or first stage vane 70' is configured to have a plurality of cooling openings 88 located on the vane or second stage vane 70.

As mentioned above the 1st vane 70' is subjected to gas temperatures well above the yield capability of its material. In addition, the $1^{st}$ vane 70' will experience a limited pressure drop from the combustor, and as such, has a very limited back flow margin. In other words, the $1^{st}$ vane 70' must has a sufficient cooling air pressure to prevent an undesired inflow or back flow of hot air into the vane.

The leading edge region of a high pressure turbine (HPT) 1st vane 70' is subjected to high static-to-total pressure ratios. As a result, the cooling holes located close to this leading-edge region (e.g., the showerhead), require sufficient internal cooling air static pressure in order to outflow or to provide sufficient film cooling on the leading edge 84 of the airfoil 82 of the vane 70'. In order to achieve this, it is necessary to minimize cooling air pressure losses from the supply to the cooling holes 88 entrance to attain sufficient out-flow-margin across the cooling holes.

This is particularly desired in a baffled vane where a significant portion of cooling air pressure losses occurs across the leading-edge baffle. Such high pressure losses across the baffle often result in insufficient out-flow-margin across the cooling holes 88 that are located on the leading edge 84 of the vane 70'. Cooling holes 88 that lack sufficient internal pressure to outflow will ingest hot air from the gas path, which results in fast deteriorate of the part thereby lowering the part durability.

To meet this limited back flow margin requirement, a unique cooling hole configuration is provided to a baffle 90 that is inserted into the internal cavity 85 of the vane 70'. FIG. 4 is a perspective cross sectional view of the vane 70' along lines 4-4 of FIG. 3. As illustrated the baffle 90 is inserted into cavity 85 of the vane 70'. In the illustrated embodiment, the baffle 90 is inserted into a cavity 85 that is adjacent to the leading edge 84 of the airfoil 82 of the vane 70'.

In one embodiment, the vane 70' is a single-feed 1st vane with leading-edge 84 cooling holes 88. However, the baffle can also be used in a 1$^{st}$ Vane that is dual fed at the leading edge. The baffle design 90 mitigates the negative effects on outflow-margin caused by flow addition to the 1st vane for cooling as well as increased high pressure turbine gas path pressure. As such, the configuration improves the high pressure turbine 1st vane durability.

Figure 3:
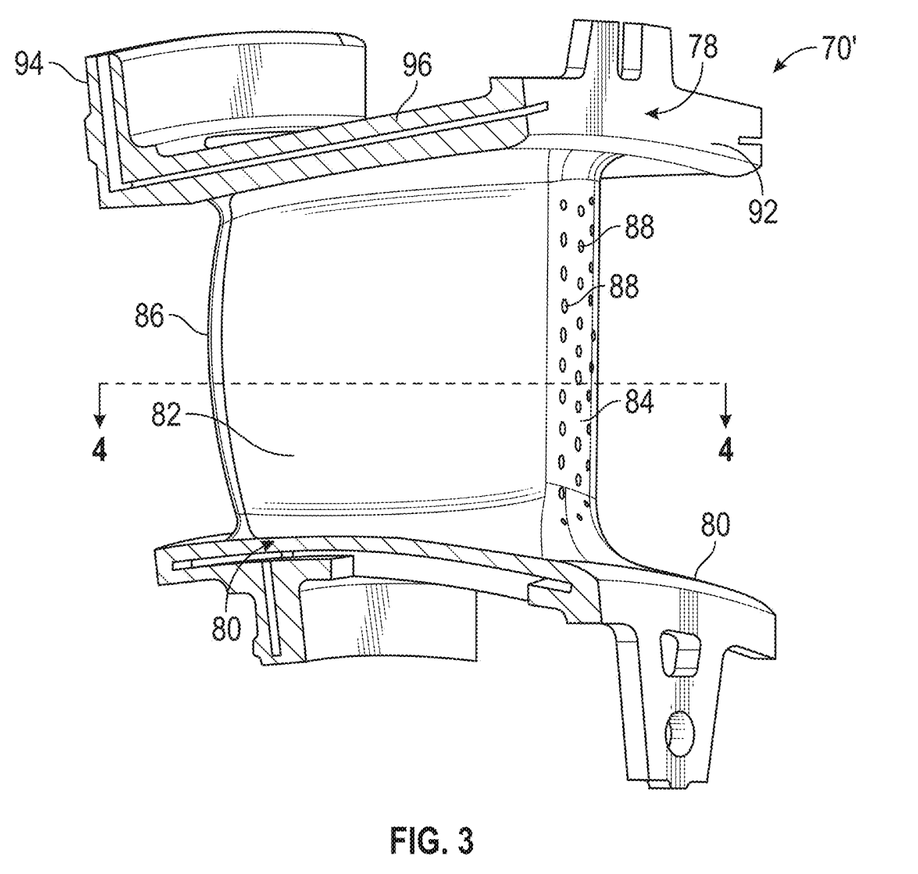
FIG. 3 is perspective view of a vane of the two-stage high pressure turbine of the gas turbine engine according to an embodiment of the present disclosure.
Figure 4:
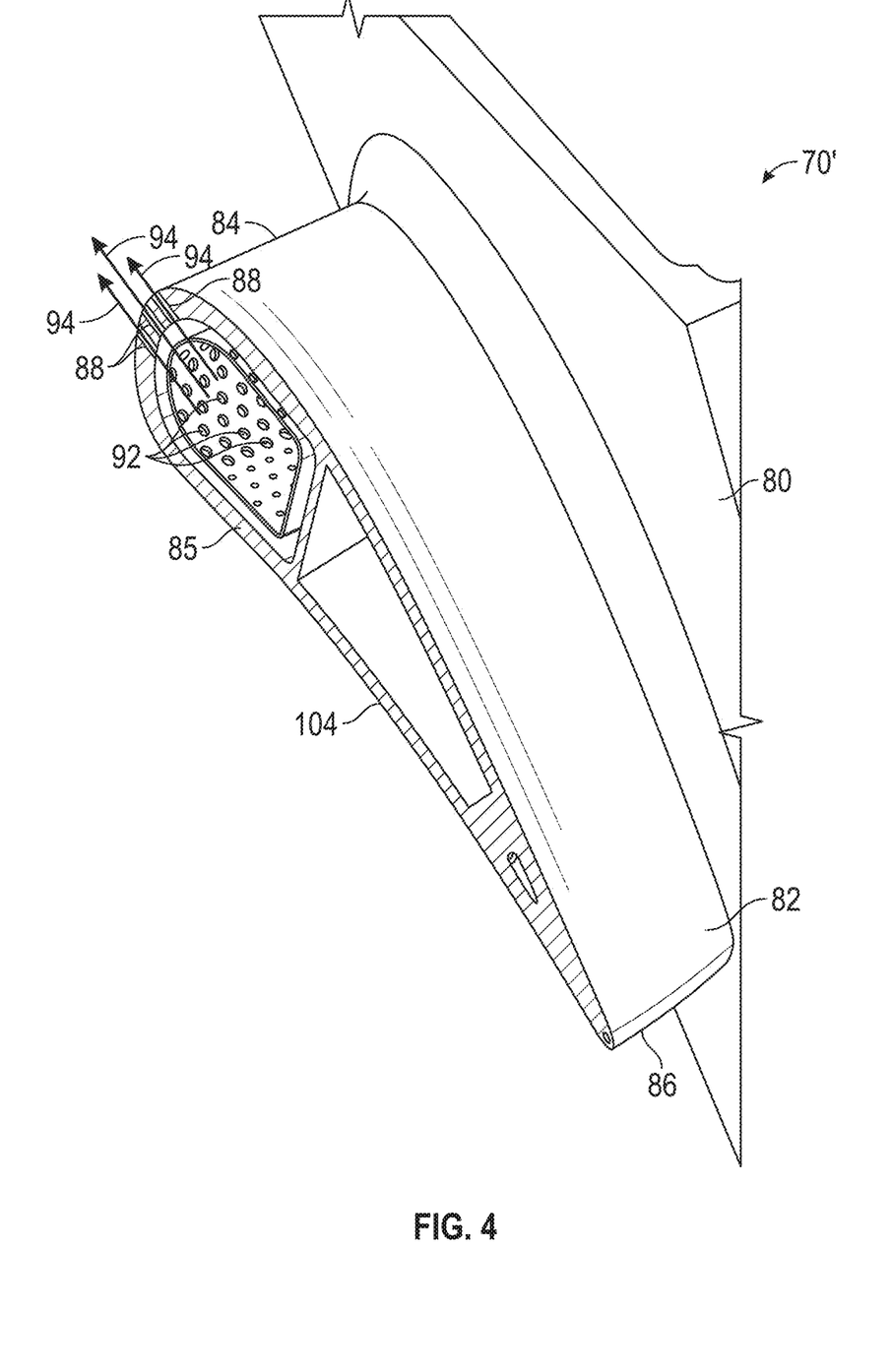
FIG. 4 is a perspective view along lines 4-4 of FIG. 3.
Figure 5:
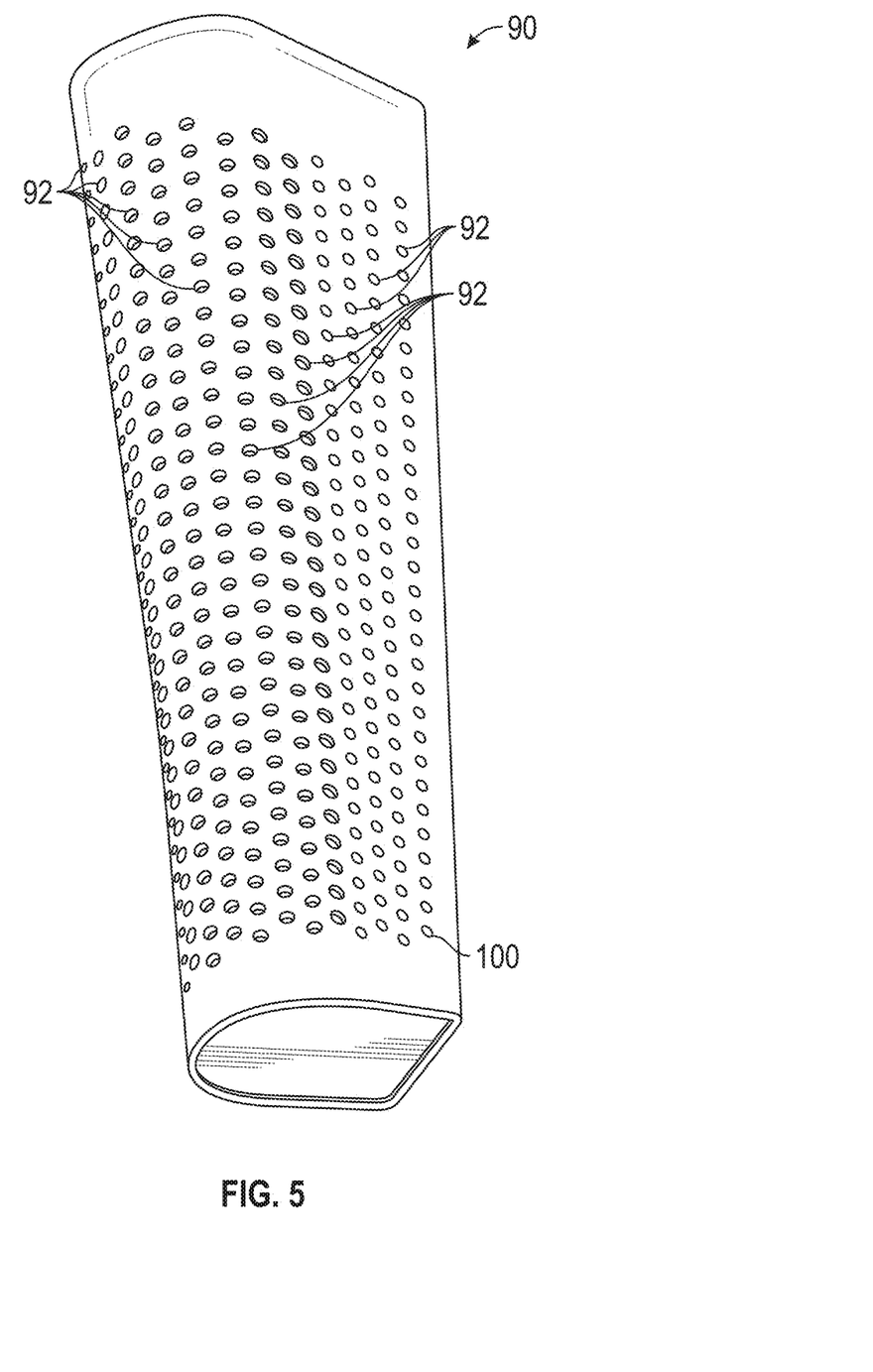
FIG. 5 is a perspective view of the baffle to be inserted into the vane of FIGS. 2-4.

FIG. 5 is a perspective view of the baffle 90 prior to it being inserted into the vane of FIGS. 2-4. In order to provide the desired cooling to the leading edge 84 of the vane 70' without unwanted back flow into the interior of the vane 70' the baffle 90 has a plurality of cooling holes 92 located therein. Cooling holes 92 allow for cooling air to flow in the direction of arrows 94.

The arrangement of the cooling holes 92 in the baffle 90 will provide a sufficient back flow margin that prevents unwanted airflow in the direction opposite to arrows 94. In one non-limiting embodiment, the cooling holes are arranged in an array 98 illustrated in FIG. 6 prior to the forming of the baffle 90 into the configuration illustrated in at least FIG. 5. One advantage of the present disclosure is that the back flow margin is met on the high pressure turbine (HPT) 1st vane 70' using the baffle design illustrated and described herein.

The unique impingement hole pattern and sizing of the high pressure turbine 1st vane baffle 90 minimizes cooling-air pressure losses across the baffle 90 and achieves a sufficient outflow-margin across the vane cooling holes 88 especially those located at the leading edge 84 of the airfoil 82. The baffle holes 92 have been sized and spaced strategically to also achieve a high impingement heat transfer on the backside of the airfoil walls to enhance backside convective cooling of the part. This baffle pattern has the following unique characteristics reflected in the drawings and hole coordinates. For example and referring now to FIG. 6, a sheet of metal 96 is provided. In one embodiment sheet of metal 96 and the impingement holes 92 may be stamped and/or drilled onto the metal sheet 94 and thereafter the metal sheet 96 is formed into the baffle 90. In other words, the baffle impingement holes 92 are formed in the sheet of metal 96 prior to it being formed into the baffle 90 illustrated in at least FIG. 5. These holes may be formed into an array 98 illustrated in at least FIGS. 5 and 6 and as described in Table 1.

Figure 6:
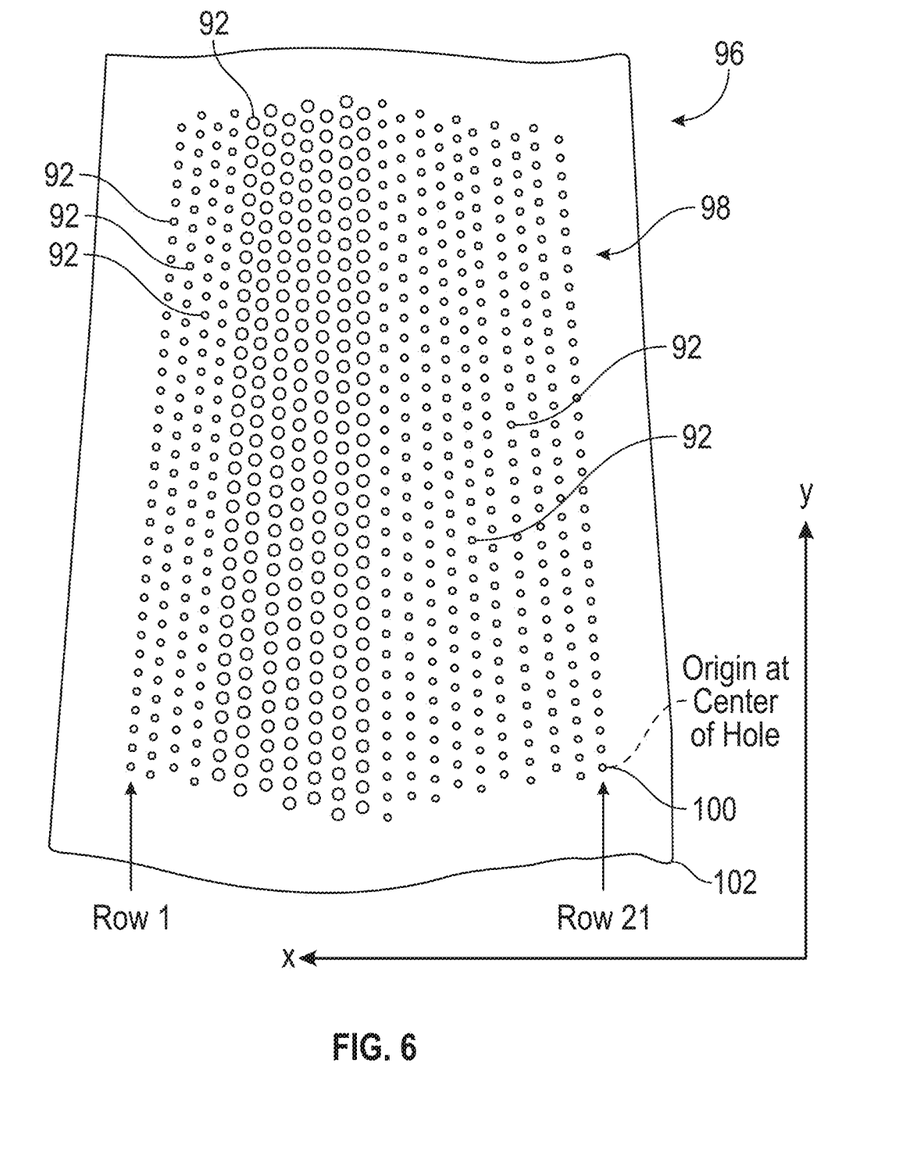
FIG. 6 is a view of the baffle in a flat configuration prior to it being manipulated into the configuration illustrated in FIGS. 4 and 5.

FIG. 6 illustrates a unique impingement hole arrangement for baffle 90 prior to it being shaped from flat sheet 96. The hole to hole spacing as well as the size of the holes is important for determining the pressure losses and internal convective cooling achieved with the baffle 90. In FIG. 6, the sheet is provided with a total of twenty one (21) rows as defined as extending along the Y axis and each new row beginning in the X axis (right to left) as illustrated in FIG. 6. In addition, each row extending in the Y axis has an alternating hole count of thirty five (35) and thirty six (36) holes 92 as shown in FIG. 6. In other words and referring now to FIG. 6, the first row of holes 92 (from left to right and extending upwardly in the Y axis when viewed in FIG. 6) has 35 holes and the second row of holes has 36 holes extending upwardly in the Y axis.

In addition and as illustrated, the holes 92 of fourteen (14) rows of the twenty one (21) rows have smaller diameters than the remaining seven (7) rows which have larger hole diameters. As illustrated and in one embodiment, the first four rows of holes 92 as defined in the X axis when viewing FIG. 6 from right to left have a smaller hole diameter than the next seven rows of holes 92 as defined in the X axis (again and as viewed from right to left in FIG. 6), which have a larger hole diameter while the remaining ten rows of holes as defined in the X axis (again and as viewed from right to left in FIG. 6) have a smaller hole diameter than the previous seven rows. In one embodiment, these holes may have the same diameter of first four rows of holes 92 mentioned above. Alternatively, these holes may have the different diameter than the first four rows of holes 92 mentioned above however, each of these holes (first four rows and last ten rows) have a diameter smaller than that of the seven rows of holes mentioned above. In one non-limiting embodiment, the holes with the larger diameter (7 rows mentioned above) correspond to or are located proximate to the cooling holes 88 of the leading edge of the vane that require a sufficient cooling air pressure to prevent back flow or an undesired inflow of hot air into the vane. As such, these larger holes will provide the required pressure to prevent back flow or an undesired inflow of hot air in a direction opposite to arrows 94 while also providing the desired cooling.

In one non-limiting embodiment, the dimensions of all of the aforementioned holes are in the range of 0.015 inches to 0.030 inches. In yet another non-limiting embodiment, the dimensions of some of the aforementioned holes may be in the range of 0.015 inches to 0.030 inches. Of course, ranges greater or less than the aforementioned ranges are considered to be within the scope of various embodiments of the present disclosure.

These hole locations may be further defined as the first four rows of holes 92 as defined in the X axis (when viewing FIG. 6 from right to left) being associated with a pressure side of the baffle 90 (e.g., a portion of the baffle 90 that is located behind the wall of the airfoil 82 that defines the pressure side of the airfoil 82 of the vane 70') while the next seven rows of holes 92 as defined in the X axis (when viewing FIG. 6 from right to left) are associated with a shower head or leading edge of the baffle 90 (e.g., a portion of the baffle 90 that is located behind the wall of the airfoil 82 that defines the leading edge 84 of the airfoil 82 of the vane 70') and the remaining ten rows of holes as defined in the X axis (when viewing FIG. 6 from right to left) are associated with a suction side of the baffle 90 (e.g., a portion of the baffle 90 that is located behind the wall of the airfoil 82 that defines the suction side of the airfoil 82 of the vane 70').

The locations of the holes in sheet 94 may further be defined by the dimensions of Table 1, wherein the center of each hole 92 is provided by the following Cartesian coordinates. In Table 1, the X and Y dimensions refer to the distance between centers of the holes in the X and Y directions respectively. The center of the impingement holes has a true position tolerance of upto 0.050 inches due to manufacturing and assembly tolerances.

TABLE 1

| Hole Row | Hole # | X | Y |
|---|---|---|---|
| Row 1 | 1 | 1.099 | 0.084 |
| Row 1 | 2 | 1.091 | 0.127 |
| Row 1 | 3 | 1.083 | 0.17 |
| Row 1 | 4 | 1.076 | 0.213 |
| Row 1 | 5 | 1.068 | 0.256 |
| Row 1 | 6 | 1.06 | 0.299 |
| Row 1 | 7 | 1.053 | 0.342 |
| Row 1 | 8 | 1.046 | 0.386 |
| Row 1 | 9 | 1.038 | 0.429 |
| Row 1 | 10 | 1.031 | 0.472 |
| Row 1 | 11 | 1.024 | 0.515 |
| Row 1 | 12 | 1.017 | 0.558 |
| Row 1 | 13 | 1.01 | 0.601 |
| Row 1 | 14 | 1.004 | 0.645 |
| Row 1 | 15 | 0.997 | 0.688 |
| Row 1 | 16 | 0.991 | 0.731 |
| Row 1 | 17 | 0.984 | 0.774 |
| Row 1 | 18 | 0.978 | 0.818 |
| Row 1 | 19 | 0.972 | 0.861 |
| Row 1 | 20 | 0.965 | 0.904 |
| Row 1 | 21 | 0.959 | 0.948 |
| Row 1 | 22 | 0.953 | 0.991 |
| Row 1 | 23 | 0.947 | 1.034 |
| Row 1 | 24 | 0.941 | 1.078 |
| Row 1 | 25 | 0.935 | 1.121 |
| Row 1 | 26 | 0.929 | 1.164 |
| Row 1 | 27 | 0.924 | 1.208 |
| Row 1 | 28 | 0.918 | 1.251 |
| Row 1 | 29 | 0.912 | 1.294 |
| Row 1 | 30 | 0.906 | 1.338 |
| Row 1 | 31 | 0.901 | 1.381 |
| Row 1 | 32 | 0.895 | 1.424 |
| Row 1 | 33 | 0.889 | 1.468 |
| Row 1 | 34 | 0.883 | 1.511 |
| Row 1 | 35 | 0.877 | 1.555 |
| Row 2 | 36 | 1.051 | 0.05 |
| Row 2 | 37 | 1.044 | 0.093 |
| Row 2 | 38 | 1.036 | 0.137 |
| Row 2 | 39 | 1.029 | 0.18 |
| Row 2 | 40 | 1.022 | 0.224 |
| Row 2 | 41 | 1.014 | 0.268 |
| Row 2 | 42 | 1.007 | 0.311 |
| Row 2 | 43 | 1 | 0.355 |
| Row 2 | 44 | 0.992 | 0.398 |
| Row 2 | 45 | 0.985 | 0.442 |
| Row 2 | 46 | 0.978 | 0.485 |
| Row 2 | 47 | 0.971 | 0.529 |
| Row 2 | 48 | 0.965 | 0.573 |
| Row 2 | 49 | 0.958 | 0.616 |
| Row 2 | 50 | 0.952 | 0.66 |
| Row 2 | 51 | 0.945 | 0.704 |
| Row 2 | 52 | 0.939 | 0.747 |
| Row 2 | 53 | 0.932 | 0.791 |
| Row 2 | 54 | 0.926 | 0.835 |
| Row 2 | 55 | 0.92 | 0.878 |
| Row 2 | 56 | 0.914 | 0.922 |
| Row 2 | 57 | 0.908 | 0.966 |
| Row 2 | 58 | 0.902 | 1.01 |
| Row 2 | 59 | 0.896 | 1.053 |
| Row 2 | 60 | 0.891 | 1.097 |
| Row 2 | 61 | 0.885 | 1.141 |
| Row 2 | 62 | 0.879 | 1.185 |
| Row 2 | 63 | 0.874 | 1.228 |
| Row 2 | 64 | 0.868 | 1.272 |
| Row 2 | 65 | 0.862 | 1.316 |
| Row 2 | 66 | 0.857 | 1.36 |
| Row 2 | 67 | 0.851 | 1.404 |
| Row 2 | 68 | 0.846 | 1.447 |
| Row 2 | 69 | 0.84 | 1.491 |
| Row 2 | 70 | 0.834 | 1.535 |
| Row 2 | 71 | 0.828 | 1.579 |
| Row 3 | 72 | 0.996 | 0.064 |
| Row 3 | 73 | 0.989 | 0.107 |
| Row 3 | 74 | 0.982 | 0.151 |
| Row 3 | 75 | 0.975 | 0.195 |
| Row 3 | 76 | 0.968 | 0.238 |
| Row 3 | 77 | 0.961 | 0.282 |
| Row 3 | 78 | 0.954 | 0.326 |
| Row 3 | 79 | 0.947 | 0.369 |
| Row 3 | 80 | 0.94 | 0.413 |
| Row 3 | 81 | 0.934 | 0.457 |
| Row 3 | 82 | 0.927 | 0.501 |
| Row 3 | 83 | 0.921 | 0.545 |
| Row 3 | 84 | 0.914 | 0.588 |
| Row 3 | 85 | 0.908 | 0.632 |
| Row 3 | 86 | 0.902 | 0.676 |
| Row 3 | 87 | 0.896 | 0.72 |
| Row 3 | 88 | 0.89 | 0.764 |
| Row 3 | 89 | 0.884 | 0.807 |
| Row 3 | 90 | 0.878 | 0.851 |
| Row 3 | 91 | 0.873 | 0.895 |
| Row 3 | 92 | 0.867 | 0.939 |
| Row 3 | 93 | 0.861 | 0.983 |
| Row 3 | 94 | 0.856 | 1.027 |
| Row 3 | 95 | 0.85 | 1.071 |
| Row 3 | 96 | 0.845 | 1.115 |
| Row 3 | 97 | 0.84 | 1.159 |
| Row 3 | 98 | 0.834 | 1.203 |
| Row 3 | 99 | 0.829 | 1.247 |
| Row 3 | 100 | 0.824 | 1.29 |
| Row 3 | 101 | 0.819 | 1.334 |
| Row 3 | 102 | 0.813 | 1.378 |
| Row 3 | 103 | 0.808 | 1.422 |
| Row 3 | 104 | 0.803 | 1.466 |
| Row 3 | 105 | 0.797 | 1.51 |
| Row 3 | 106 | 0.792 | 1.554 |
| Row 4 | 107 | 0.95 | 0.028 |
| Row 4 | 108 | 0.943 | 0.072 |
| Row 4 | 109 | 0.937 | 0.116 |
| Row 4 | 110 | 0.93 | 0.16 |
| Row 4 | 111 | 0.923 | 0.205 |
| Row 4 | 112 | 0.916 | 0.249 |
| Row 4 | 113 | 0.909 | 0.293 |
| Row 4 | 114 | 0.903 | 0.337 |
| Row 4 | 115 | 0.896 | 0.381 |
| Row 4 | 116 | 0.889 | 0.425 |
| Row 4 | 117 | 0.883 | 0.47 |
| Row 4 | 118 | 0.877 | 0.514 |
| Row 4 | 119 | 0.871 | 0.558 |
| Row 4 | 120 | 0.865 | 0.602 |
| Row 4 | 121 | 0.859 | 0.647 |
| Row 4 | 122 | 0.853 | 0.691 |
| Row 4 | 123 | 0.847 | 0.735 |
| Row 4 | 124 | 0.842 | 0.78 |
| Row 4 | 125 | 0.836 | 0.824 |
| Row 4 | 126 | 0.831 | 0.868 |
| Row 4 | 127 | 0.825 | 0.913 |
| Row 4 | 128 | 0.82 | 0.957 |
| Row 4 | 129 | 0.815 | 1.001 |
| Row 4 | 130 | 0.81 | 1.046 |
| Row 4 | 131 | 0.805 | 1.09 |
| Row 4 | 132 | 0.799 | 1.134 |
| Row 4 | 133 | 0.794 | 1.179 |
| Row 4 | 134 | 0.79 | 1.223 |
| Row 4 | 135 | 0.785 | 1.268 |
| Row 4 | 136 | 0.78 | 1.312 |
| Row 4 | 137 | 0.775 | 1.356 |

TABLE 1-continued

| Hole Row | Hole # | X | Y |
|---|---|---|---|
| Row 4 | 138 | 0.77 | 1.401 |
| Row 4 | 139 | 0.765 | 1.445 |
| Row 4 | 140 | 0.76 | 1.49 |
| Row 4 | 141 | 0.755 | 1.534 |
| Row 4 | 142 | 0.75 | 1.578 |
| Row 5 | 143 | 0.894 | 0.04 |
| Row 5 | 144 | 0.887 | 0.084 |
| Row 5 | 145 | 0.881 | 0.129 |
| Row 5 | 146 | 0.874 | 0.173 |
| Row 5 | 147 | 0.868 | 0.218 |
| Row 5 | 148 | 0.861 | 0.262 |
| Row 5 | 149 | 0.855 | 0.306 |
| Row 5 | 150 | 0.848 | 0.351 |
| Row 5 | 151 | 0.842 | 0.395 |
| Row 5 | 152 | 0.836 | 0.439 |
| Row 5 | 153 | 0.83 | 0.484 |
| Row 5 | 154 | 0.824 | 0.528 |
| Row 5 | 155 | 0.819 | 0.573 |
| Row 5 | 156 | 0.813 | 0.617 |
| Row 5 | 157 | 0.808 | 0.662 |
| Row 5 | 158 | 0.802 | 0.706 |
| Row 5 | 159 | 0.797 | 0.751 |
| Row 5 | 160 | 0.792 | 0.795 |
| Row 5 | 161 | 0.787 | 0.84 |
| Row 5 | 162 | 0.781 | 0.885 |
| Row 5 | 163 | 0.776 | 0.929 |
| Row 5 | 164 | 0.771 | 0.974 |
| Row 5 | 165 | 0.767 | 1.018 |
| Row 5 | 166 | 0.762 | 1.063 |
| Row 5 | 167 | 0.757 | 1.107 |
| Row 5 | 168 | 0.752 | 1.152 |
| Row 5 | 169 | 0.748 | 1.197 |
| Row 5 | 170 | 0.743 | 1.241 |
| Row 5 | 171 | 0.738 | 1.286 |
| Row 5 | 172 | 0.734 | 1.33 |
| Row 5 | 173 | 0.729 | 1.375 |
| Row 5 | 174 | 0.725 | 1.42 |
| Row 5 | 175 | 0.72 | 1.464 |
| Row 5 | 176 | 0.716 | 1.509 |
| Row 5 | 177 | 0.711 | 1.553 |
| Row 6 | 178 | 0.845 | 0 |
| Row 6 | 179 | 0.839 | 0.045 |
| Row 6 | 180 | 0.833 | 0.09 |
| Row 6 | 181 | 0.827 | 0.135 |
| Row 6 | 182 | 0.821 | 0.18 |
| Row 6 | 183 | 0.815 | 0.225 |
| Row 6 | 184 | 0.809 | 0.27 |
| Row 6 | 185 | 0.803 | 0.315 |
| Row 6 | 186 | 0.797 | 0.36 |
| Row 6 | 187 | 0.792 | 0.405 |
| Row 6 | 188 | 0.786 | 0.45 |
| Row 6 | 189 | 0.78 | 0.496 |
| Row 6 | 190 | 0.775 | 0.541 |
| Row 6 | 191 | 0.77 | 0.586 |
| Row 6 | 192 | 0.764 | 0.631 |
| Row 6 | 193 | 0.759 | 0.676 |
| Row 6 | 194 | 0.754 | 0.721 |
| Row 6 | 195 | 0.749 | 0.766 |
| Row 6 | 196 | 0.744 | 0.811 |
| Row 6 | 197 | 0.74 | 0.856 |
| Row 6 | 198 | 0.735 | 0.902 |
| Row 6 | 199 | 0.73 | 0.947 |
| Row 6 | 200 | 0.725 | 0.992 |
| Row 6 | 201 | 0.721 | 1.037 |
| Row 6 | 202 | 0.716 | 1.082 |
| Row 6 | 203 | 0.712 | 1.127 |
| Row 6 | 204 | 0.707 | 1.173 |
| Row 6 | 205 | 0.703 | 1.218 |
| Row 6 | 206 | 0.698 | 1.263 |
| Row 6 | 207 | 0.694 | 1.308 |
| Row 6 | 208 | 0.689 | 1.353 |
| Row 6 | 209 | 0.685 | 1.399 |
| Row 6 | 210 | 0.68 | 1.444 |
| Row 6 | 211 | 0.676 | 1.489 |
| Row 6 | 212 | 0.671 | 1.534 |
| Row 6 | 213 | 0.667 | 1.579 |
| Row 7 | 214 | 0.787 | 0.007 |
| Row 7 | 215 | 0.781 | 0.052 |
| Row 7 | 216 | 0.776 | 0.098 |
| Row 7 | 217 | 0.771 | 0.143 |
| Row 7 | 218 | 0.765 | 0.189 |
| Row 7 | 219 | 0.76 | 0.234 |
| Row 7 | 220 | 0.754 | 0.28 |
| Row 7 | 221 | 0.749 | 0.325 |
| Row 7 | 222 | 0.744 | 0.371 |
| Row 7 | 223 | 0.739 | 0.416 |
| Row 7 | 224 | 0.733 | 0.462 |
| Row 7 | 225 | 0.728 | 0.507 |
| Row 7 | 226 | 0.723 | 0.553 |
| Row 7 | 227 | 0.718 | 0.598 |
| Row 7 | 228 | 0.714 | 0.644 |
| Row 7 | 229 | 0.709 | 0.689 |
| Row 7 | 230 | 0.704 | 0.735 |
| Row 7 | 231 | 0.7 | 0.78 |
| Row 7 | 232 | 0.695 | 0.826 |
| Row 7 | 233 | 0.69 | 0.871 |
| Row 7 | 234 | 0.686 | 0.917 |
| Row 7 | 235 | 0.681 | 0.963 |
| Row 7 | 236 | 0.677 | 1.008 |
| Row 7 | 237 | 0.673 | 1.054 |
| Row 7 | 238 | 0.668 | 1.099 |
| Row 7 | 239 | 0.664 | 1.145 |
| Row 7 | 240 | 0.66 | 1.19 |
| Row 7 | 241 | 0.655 | 1.236 |
| Row 7 | 242 | 0.651 | 1.282 |
| Row 7 | 243 | 0.647 | 1.327 |
| Row 7 | 244 | 0.643 | 1.373 |
| Row 7 | 245 | 0.638 | 1.418 |
| Row 7 | 246 | 0.634 | 1.464 |
| Row 7 | 247 | 0.63 | 1.509 |
| Row 7 | 248 | 0.626 | 1.555 |
| Row 8 | 249 | 0.733 | −0.037 |
| Row 8 | 250 | 0.728 | 0.009 |
| Row 8 | 251 | 0.723 | 0.056 |
| Row 8 | 252 | 0.719 | 0.102 |
| Row 8 | 253 | 0.714 | 0.148 |
| Row 8 | 254 | 0.709 | 0.194 |
| Row 8 | 255 | 0.704 | 0.24 |
| Row 8 | 256 | 0.699 | 0.287 |
| Row 8 | 257 | 0.695 | 0.333 |
| Row 8 | 258 | 0.69 | 0.379 |
| Row 8 | 259 | 0.685 | 0.425 |
| Row 8 | 260 | 0.681 | 0.471 |
| Row 8 | 261 | 0.676 | 0.518 |
| Row 8 | 262 | 0.671 | 0.564 |
| Row 8 | 263 | 0.667 | 0.61 |
| Row 8 | 264 | 0.662 | 0.656 |
| Row 8 | 265 | 0.658 | 0.703 |
| Row 8 | 266 | 0.654 | 0.749 |
| Row 8 | 267 | 0.649 | 0.795 |
| Row 8 | 268 | 0.645 | 0.841 |
| Row 8 | 269 | 0.641 | 0.888 |
| Row 8 | 270 | 0.637 | 0.934 |
| Row 8 | 271 | 0.632 | 0.98 |
| Row 8 | 272 | 0.628 | 1.027 |
| Row 8 | 273 | 0.624 | 1.073 |
| Row 8 | 274 | 0.62 | 1.119 |
| Row 8 | 275 | 0.616 | 1.165 |
| Row 8 | 276 | 0.612 | 1.212 |
| Row 8 | 277 | 0.608 | 1.258 |
| Row 8 | 278 | 0.604 | 1.304 |
| Row 8 | 279 | 0.6 | 1.351 |
| Row 8 | 280 | 0.596 | 1.397 |
| Row 8 | 281 | 0.592 | 1.443 |
| Row 8 | 282 | 0.587 | 1.489 |
| Row 8 | 283 | 0.583 | 1.536 |
| Row 8 | 284 | 0.579 | 1.582 |
| Row 9 | 285 | 0.675 | −0.029 |
| Row 9 | 286 | 0.671 | 0.018 |
| Row 9 | 287 | 0.666 | 0.065 |
| Row 9 | 288 | 0.662 | 0.111 |
| Row 9 | 289 | 0.657 | 0.158 |
| Row 9 | 290 | 0.653 | 0.205 |
| Row 9 | 291 | 0.648 | 0.251 |
| Row 9 | 292 | 0.644 | 0.298 |
| Row 9 | 293 | 0.64 | 0.344 |

TABLE 1-continued

| Hole Row | Hole # | X | Y |
| --- | --- | --- | --- |
| Row 9 | 294 | 0.636 | 0.391 |
| Row 9 | 295 | 0.631 | 0.438 |
| Row 9 | 296 | 0.627 | 0.484 |
| Row 9 | 297 | 0.623 | 0.531 |
| Row 9 | 298 | 0.619 | 0.578 |
| Row 9 | 299 | 0.615 | 0.624 |
| Row 9 | 300 | 0.611 | 0.671 |
| Row 9 | 301 | 0.607 | 0.718 |
| Row 9 | 302 | 0.602 | 0.764 |
| Row 9 | 303 | 0.598 | 0.811 |
| Row 9 | 304 | 0.594 | 0.857 |
| Row 9 | 305 | 0.59 | 0.904 |
| Row 9 | 306 | 0.587 | 0.951 |
| Row 9 | 307 | 0.583 | 0.997 |
| Row 9 | 308 | 0.579 | 1.044 |
| Row 9 | 309 | 0.575 | 1.091 |
| Row 9 | 310 | 0.571 | 1.137 |
| Row 9 | 311 | 0.568 | 1.184 |
| Row 9 | 312 | 0.564 | 1.231 |
| Row 9 | 313 | 0.56 | 1.277 |
| Row 9 | 314 | 0.556 | 1.324 |
| Row 9 | 315 | 0.553 | 1.371 |
| Row 9 | 316 | 0.549 | 1.418 |
| Row 9 | 317 | 0.545 | 1.464 |
| Row 9 | 318 | 0.541 | 1.511 |
| Row 9 | 319 | 0.538 | 1.558 |
| Row 10 | 320 | 0.622 | −0.071 |
| Row 10 | 321 | 0.618 | −0.024 |
| Row 10 | 322 | 0.614 | 0.023 |
| Row 10 | 323 | 0.61 | 0.071 |
| Row 10 | 324 | 0.605 | 0.118 |
| Row 10 | 325 | 0.601 | 0.165 |
| Row 10 | 326 | 0.597 | 0.212 |
| Row 10 | 327 | 0.593 | 0.26 |
| Row 10 | 328 | 0.589 | 0.307 |
| Row 10 | 329 | 0.585 | 0.354 |
| Row 10 | 330 | 0.581 | 0.402 |
| Row 10 | 331 | 0.578 | 0.449 |
| Row 10 | 332 | 0.574 | 0.496 |
| Row 10 | 333 | 0.57 | 0.544 |
| Row 10 | 334 | 0.566 | 0.591 |
| Row 10 | 335 | 0.562 | 0.638 |
| Row 10 | 336 | 0.559 | 0.685 |
| Row 10 | 337 | 0.555 | 0.733 |
| Row 10 | 338 | 0.551 | 0.78 |
| Row 10 | 339 | 0.547 | 0.827 |
| Row 10 | 340 | 0.544 | 0.875 |
| Row 10 | 341 | 0.54 | 0.922 |
| Row 10 | 342 | 0.536 | 0.969 |
| Row 10 | 343 | 0.533 | 1.017 |
| Row 10 | 344 | 0.529 | 1.064 |
| Row 10 | 345 | 0.526 | 1.111 |
| Row 10 | 346 | 0.522 | 1.159 |
| Row 10 | 347 | 0.519 | 1.206 |
| Row 10 | 348 | 0.516 | 1.253 |
| Row 10 | 349 | 0.512 | 1.301 |
| Row 10 | 350 | 0.509 | 1.348 |
| Row 10 | 351 | 0.505 | 1.395 |
| Row 10 | 352 | 0.502 | 1.443 |
| Row 10 | 353 | 0.498 | 1.49 |
| Row 10 | 354 | 0.495 | 1.537 |
| Row 10 | 355 | 0.492 | 1.585 |
| Row 11 | 356 | 0.564 | −0.06 |
| Row 11 | 357 | 0.56 | −0.012 |
| Row 11 | 358 | 0.557 | 0.036 |
| Row 11 | 359 | 0.553 | 0.083 |
| Row 11 | 360 | 0.55 | 0.131 |
| Row 11 | 361 | 0.547 | 0.178 |
| Row 11 | 362 | 0.543 | 0.226 |
| Row 11 | 363 | 0.54 | 0.274 |
| Row 11 | 364 | 0.537 | 0.321 |
| Row 11 | 365 | 0.533 | 0.369 |
| Row 11 | 366 | 0.53 | 0.416 |
| Row 11 | 367 | 0.526 | 0.464 |
| Row 11 | 368 | 0.523 | 0.512 |
| Row 11 | 369 | 0.52 | 0.559 |
| Row 11 | 370 | 0.517 | 0.607 |
| Row 11 | 371 | 0.513 | 0.654 |
| Row 11 | 372 | 0.51 | 0.702 |
| Row 11 | 373 | 0.506 | 0.75 |
| Row 11 | 374 | 0.503 | 0.797 |
| Row 11 | 375 | 0.5 | 0.845 |
| Row 11 | 376 | 0.496 | 0.892 |
| Row 11 | 377 | 0.493 | 0.94 |
| Row 11 | 378 | 0.49 | 0.988 |
| Row 11 | 379 | 0.486 | 1.035 |
| Row 11 | 380 | 0.483 | 1.083 |
| Row 11 | 381 | 0.48 | 1.13 |
| Row 11 | 382 | 0.477 | 1.178 |
| Row 11 | 383 | 0.474 | 1.226 |
| Row 11 | 384 | 0.47 | 1.273 |
| Row 11 | 385 | 0.467 | 1.321 |
| Row 11 | 386 | 0.464 | 1.368 |
| Row 11 | 387 | 0.46 | 1.416 |
| Row 11 | 388 | 0.457 | 1.464 |
| Row 11 | 389 | 0.454 | 1.511 |
| Row 11 | 390 | 0.451 | 1.559 |
| Row 12 | 391 | 0.508 | −0.086 |
| Row 12 | 392 | 0.506 | −0.038 |
| Row 12 | 393 | 0.503 | 0.009 |
| Row 12 | 394 | 0.5 | 0.057 |
| Row 12 | 395 | 0.497 | 0.104 |
| Row 12 | 396 | 0.495 | 0.152 |
| Row 12 | 397 | 0.492 | 0.199 |
| Row 12 | 398 | 0.489 | 0.247 |
| Row 12 | 399 | 0.487 | 0.294 |
| Row 12 | 400 | 0.484 | 0.342 |
| Row 12 | 401 | 0.481 | 0.389 |
| Row 12 | 402 | 0.478 | 0.437 |
| Row 12 | 403 | 0.475 | 0.484 |
| Row 12 | 404 | 0.473 | 0.532 |
| Row 12 | 405 | 0.47 | 0.579 |
| Row 12 | 406 | 0.467 | 0.627 |
| Row 12 | 407 | 0.464 | 0.674 |
| Row 12 | 408 | 0.461 | 0.722 |
| Row 12 | 409 | 0.458 | 0.769 |
| Row 12 | 410 | 0.455 | 0.817 |
| Row 12 | 411 | 0.452 | 0.864 |
| Row 12 | 412 | 0.449 | 0.912 |
| Row 12 | 413 | 0.446 | 0.959 |
| Row 12 | 414 | 0.443 | 1.007 |
| Row 12 | 415 | 0.44 | 1.054 |
| Row 12 | 416 | 0.437 | 1.102 |
| Row 12 | 417 | 0.434 | 1.149 |
| Row 12 | 418 | 0.431 | 1.197 |
| Row 12 | 419 | 0.428 | 1.244 |
| Row 12 | 420 | 0.425 | 1.292 |
| Row 12 | 421 | 0.422 | 1.339 |
| Row 12 | 422 | 0.419 | 1.387 |
| Row 12 | 423 | 0.416 | 1.434 |
| Row 12 | 424 | 0.413 | 1.482 |
| Row 12 | 425 | 0.41 | 1.529 |
| Row 12 | 426 | 0.407 | 1.577 |
| Row 13 | 427 | 0.448 | −0.042 |
| Row 13 | 428 | 0.446 | 0.005 |
| Row 13 | 429 | 0.444 | 0.051 |
| Row 13 | 430 | 0.443 | 0.098 |
| Row 13 | 431 | 0.441 | 0.144 |
| Row 13 | 432 | 0.44 | 0.191 |
| Row 13 | 433 | 0.438 | 0.237 |
| Row 13 | 434 | 0.436 | 0.283 |
| Row 13 | 435 | 0.434 | 0.33 |
| Row 13 | 436 | 0.432 | 0.376 |
| Row 13 | 437 | 0.43 | 0.423 |
| Row 13 | 438 | 0.428 | 0.469 |
| Row 13 | 439 | 0.426 | 0.516 |
| Row 13 | 440 | 0.424 | 0.562 |
| Row 13 | 441 | 0.422 | 0.608 |
| Row 13 | 442 | 0.42 | 0.655 |
| Row 13 | 443 | 0.417 | 0.701 |
| Row 13 | 444 | 0.414 | 0.748 |
| Row 13 | 445 | 0.412 | 0.794 |
| Row 13 | 446 | 0.409 | 0.84 |
| Row 13 | 447 | 0.407 | 0.887 |
| Row 13 | 448 | 0.404 | 0.933 |
| Row 13 | 449 | 0.401 | 0.98 |

TABLE 1-continued

| Hole Row | Hole # | X | Y |
|---|---|---|---|
| Row 13 | 450 | 0.399 | 1.026 |
| Row 13 | 451 | 0.396 | 1.072 |
| Row 13 | 452 | 0.393 | 1.119 |
| Row 13 | 453 | 0.39 | 1.165 |
| Row 13 | 454 | 0.387 | 1.211 |
| Row 13 | 455 | 0.384 | 1.258 |
| Row 13 | 456 | 0.381 | 1.304 |
| Row 13 | 457 | 0.378 | 1.351 |
| Row 13 | 458 | 0.375 | 1.397 |
| Row 13 | 459 | 0.372 | 1.443 |
| Row 13 | 460 | 0.368 | 1.49 |
| Row 13 | 461 | 0.365 | 1.536 |
| Row 14 | 462 | 0.392 | −0.054 |
| Row 14 | 463 | 0.391 | −0.008 |
| Row 14 | 464 | 0.39 | 0.038 |
| Row 14 | 465 | 0.389 | 0.083 |
| Row 14 | 466 | 0.388 | 0.129 |
| Row 14 | 467 | 0.387 | 0.175 |
| Row 14 | 468 | 0.386 | 0.221 |
| Row 14 | 469 | 0.385 | 0.267 |
| Row 14 | 470 | 0.383 | 0.312 |
| Row 14 | 471 | 0.382 | 0.358 |
| Row 14 | 472 | 0.38 | 0.404 |
| Row 14 | 473 | 0.379 | 0.45 |
| Row 14 | 474 | 0.377 | 0.496 |
| Row 14 | 475 | 0.375 | 0.541 |
| Row 14 | 476 | 0.374 | 0.587 |
| Row 14 | 477 | 0.372 | 0.633 |
| Row 14 | 478 | 0.37 | 0.679 |
| Row 14 | 479 | 0.368 | 0.724 |
| Row 14 | 480 | 0.365 | 0.77 |
| Row 14 | 481 | 0.363 | 0.816 |
| Row 14 | 482 | 0.361 | 0.862 |
| Row 14 | 483 | 0.359 | 0.907 |
| Row 14 | 484 | 0.356 | 0.953 |
| Row 14 | 485 | 0.354 | 0.999 |
| Row 14 | 486 | 0.351 | 1.045 |
| Row 14 | 487 | 0.349 | 1.09 |
| Row 14 | 488 | 0.346 | 1.136 |
| Row 14 | 489 | 0.343 | 1.182 |
| Row 14 | 490 | 0.34 | 1.228 |
| Row 14 | 491 | 0.337 | 1.273 |
| Row 14 | 492 | 0.334 | 1.319 |
| Row 14 | 493 | 0.331 | 1.365 |
| Row 14 | 494 | 0.328 | 1.41 |
| Row 14 | 495 | 0.325 | 1.456 |
| Row 14 | 496 | 0.322 | 1.502 |
| Row 14 | 497 | 0.319 | 1.548 |
| Row 15 | 498 | 0.338 | −0.019 |
| Row 15 | 499 | 0.337 | 0.026 |
| Row 15 | 500 | 0.336 | 0.071 |
| Row 15 | 501 | 0.336 | 0.116 |
| Row 15 | 502 | 0.335 | 0.161 |
| Row 15 | 503 | 0.334 | 0.206 |
| Row 15 | 504 | 0.333 | 0.251 |
| Row 15 | 505 | 0.332 | 0.297 |
| Row 15 | 506 | 0.331 | 0.342 |
| Row 15 | 507 | 0.33 | 0.387 |
| Row 15 | 508 | 0.328 | 0.432 |
| Row 15 | 509 | 0.327 | 0.477 |
| Row 15 | 510 | 0.326 | 0.522 |
| Row 15 | 511 | 0.325 | 0.567 |
| Row 15 | 512 | 0.323 | 0.612 |
| Row 15 | 513 | 0.321 | 0.657 |
| Row 15 | 514 | 0.32 | 0.702 |
| Row 15 | 515 | 0.318 | 0.747 |
| Row 15 | 516 | 0.316 | 0.792 |
| Row 15 | 517 | 0.314 | 0.837 |
| Row 15 | 518 | 0.312 | 0.882 |
| Row 15 | 519 | 0.31 | 0.927 |
| Row 15 | 520 | 0.308 | 0.972 |
| Row 15 | 521 | 0.306 | 1.017 |
| Row 15 | 522 | 0.304 | 1.062 |
| Row 15 | 523 | 0.302 | 1.106 |
| Row 15 | 524 | 0.299 | 1.151 |
| Row 15 | 525 | 0.297 | 1.196 |
| Row 15 | 526 | 0.294 | 1.241 |
| Row 15 | 527 | 0.292 | 1.286 |
| Row 15 | 528 | 0.289 | 1.331 |
| Row 15 | 529 | 0.287 | 1.376 |
| Row 15 | 530 | 0.284 | 1.421 |
| Row 15 | 531 | 0.282 | 1.466 |
| Row 15 | 532 | 0.279 | 1.511 |
| Row 16 | 533 | 0.285 | −0.036 |
| Row 16 | 534 | 0.284 | 0.009 |
| Row 16 | 535 | 0.284 | 0.053 |
| Row 16 | 536 | 0.283 | 0.098 |
| Row 16 | 537 | 0.282 | 0.143 |
| Row 16 | 538 | 0.282 | 0.187 |
| Row 16 | 539 | 0.281 | 0.232 |
| Row 16 | 540 | 0.281 | 0.277 |
| Row 16 | 541 | 0.28 | 0.321 |
| Row 16 | 542 | 0.279 | 0.366 |
| Row 16 | 543 | 0.278 | 0.411 |
| Row 16 | 544 | 0.277 | 0.455 |
| Row 16 | 545 | 0.276 | 0.5 |
| Row 16 | 546 | 0.275 | 0.545 |
| Row 16 | 547 | 0.274 | 0.589 |
| Row 16 | 548 | 0.273 | 0.634 |
| Row 16 | 549 | 0.272 | 0.679 |
| Row 16 | 550 | 0.27 | 0.723 |
| Row 16 | 551 | 0.269 | 0.768 |
| Row 16 | 552 | 0.268 | 0.813 |
| Row 16 | 553 | 0.266 | 0.857 |
| Row 16 | 554 | 0.264 | 0.902 |
| Row 16 | 555 | 0.263 | 0.946 |
| Row 16 | 556 | 0.261 | 0.991 |
| Row 16 | 557 | 0.259 | 1.036 |
| Row 16 | 558 | 0.257 | 1.08 |
| Row 16 | 559 | 0.255 | 1.125 |
| Row 16 | 560 | 0.254 | 1.17 |
| Row 16 | 561 | 0.252 | 1.214 |
| Row 16 | 562 | 0.25 | 1.259 |
| Row 16 | 563 | 0.248 | 1.303 |
| Row 16 | 564 | 0.246 | 1.348 |
| Row 16 | 565 | 0.244 | 1.393 |
| Row 16 | 566 | 0.242 | 1.437 |
| Row 16 | 567 | 0.24 | 1.482 |
| Row 16 | 568 | 0.238 | 1.527 |
| Row 17 | 569 | 0.231 | −0.005 |
| Row 17 | 570 | 0.23 | 0.039 |
| Row 17 | 571 | 0.23 | 0.083 |
| Row 17 | 572 | 0.23 | 0.127 |
| Row 17 | 573 | 0.23 | 0.171 |
| Row 17 | 574 | 0.229 | 0.215 |
| Row 17 | 575 | 0.229 | 0.259 |
| Row 17 | 576 | 0.229 | 0.303 |
| Row 17 | 577 | 0.229 | 0.347 |
| Row 17 | 578 | 0.228 | 0.392 |
| Row 17 | 579 | 0.228 | 0.436 |
| Row 17 | 580 | 0.227 | 0.48 |
| Row 17 | 581 | 0.226 | 0.524 |
| Row 17 | 582 | 0.225 | 0.568 |
| Row 17 | 583 | 0.225 | 0.612 |
| Row 17 | 584 | 0.224 | 0.656 |
| Row 17 | 585 | 0.223 | 0.7 |
| Row 17 | 586 | 0.222 | 0.744 |
| Row 17 | 587 | 0.221 | 0.788 |
| Row 17 | 588 | 0.22 | 0.832 |
| Row 17 | 589 | 0.219 | 0.876 |
| Row 17 | 590 | 0.217 | 0.92 |
| Row 17 | 591 | 0.216 | 0.964 |
| Row 17 | 592 | 0.215 | 1.009 |
| Row 17 | 593 | 0.213 | 1.053 |
| Row 17 | 594 | 0.212 | 1.097 |
| Row 17 | 595 | 0.211 | 1.141 |
| Row 17 | 596 | 0.209 | 1.185 |
| Row 17 | 597 | 0.208 | 1.229 |
| Row 17 | 598 | 0.206 | 1.273 |
| Row 17 | 599 | 0.205 | 1.317 |
| Row 17 | 600 | 0.203 | 1.361 |
| Row 17 | 601 | 0.202 | 1.405 |
| Row 17 | 602 | 0.2 | 1.449 |
| Row 17 | 603 | 0.199 | 1.493 |
| Row 18 | 604 | 0.167 | −0.026 |
| Row 18 | 605 | 0.167 | 0.018 |

TABLE 1-continued

| Hole Row | Hole # | X | Y |
|---|---|---|---|
| Row 18 | 606 | 0.167 | 0.062 |
| Row 18 | 607 | 0.167 | 0.106 |
| Row 18 | 608 | 0.167 | 0.15 |
| Row 18 | 609 | 0.167 | 0.194 |
| Row 18 | 610 | 0.167 | 0.237 |
| Row 18 | 611 | 0.167 | 0.281 |
| Row 18 | 612 | 0.167 | 0.325 |
| Row 18 | 613 | 0.167 | 0.369 |
| Row 18 | 614 | 0.167 | 0.413 |
| Row 18 | 615 | 0.167 | 0.457 |
| Row 18 | 616 | 0.167 | 0.5 |
| Row 18 | 617 | 0.166 | 0.544 |
| Row 18 | 618 | 0.166 | 0.588 |
| Row 18 | 619 | 0.165 | 0.632 |
| Row 18 | 620 | 0.165 | 0.676 |
| Row 18 | 621 | 0.164 | 0.72 |
| Row 18 | 622 | 0.164 | 0.764 |
| Row 18 | 623 | 0.163 | 0.807 |
| Row 18 | 624 | 0.162 | 0.851 |
| Row 18 | 625 | 0.162 | 0.895 |
| Row 18 | 626 | 0.161 | 0.939 |
| Row 18 | 627 | 0.16 | 0.983 |
| Row 18 | 628 | 0.159 | 1.027 |
| Row 18 | 629 | 0.158 | 1.07 |
| Row 18 | 630 | 0.157 | 1.114 |
| Row 18 | 631 | 0.156 | 1.158 |
| Row 18 | 632 | 0.155 | 1.202 |
| Row 18 | 633 | 0.154 | 1.246 |
| Row 18 | 634 | 0.153 | 1.29 |
| Row 18 | 635 | 0.152 | 1.334 |
| Row 18 | 636 | 0.151 | 1.377 |
| Row 18 | 637 | 0.15 | 1.421 |
| Row 18 | 638 | 0.149 | 1.465 |
| Row 18 | 639 | 0.148 | 1.509 |
| Row 19 | 640 | 0.108 | 0.001 |
| Row 19 | 641 | 0.109 | 0.044 |
| Row 19 | 642 | 0.109 | 0.088 |
| Row 19 | 643 | 0.109 | 0.131 |
| Row 19 | 644 | 0.11 | 0.174 |
| Row 19 | 645 | 0.11 | 0.218 |
| Row 19 | 646 | 0.111 | 0.261 |
| Row 19 | 647 | 0.111 | 0.305 |
| Row 19 | 648 | 0.111 | 0.348 |
| Row 19 | 649 | 0.112 | 0.392 |
| Row 19 | 650 | 0.112 | 0.435 |
| Row 19 | 651 | 0.112 | 0.478 |
| Row 19 | 652 | 0.112 | 0.522 |
| Row 19 | 653 | 0.112 | 0.565 |
| Row 19 | 654 | 0.112 | 0.609 |
| Row 19 | 655 | 0.112 | 0.652 |
| Row 19 | 656 | 0.112 | 0.695 |
| Row 19 | 657 | 0.112 | 0.739 |
| Row 19 | 658 | 0.111 | 0.782 |
| Row 19 | 659 | 0.111 | 0.826 |
| Row 19 | 660 | 0.111 | 0.869 |
| Row 19 | 661 | 0.11 | 0.913 |
| Row 19 | 662 | 0.11 | 0.956 |
| Row 19 | 663 | 0.109 | 0.999 |
| Row 19 | 664 | 0.109 | 1.043 |
| Row 19 | 665 | 0.108 | 1.086 |
| Row 19 | 666 | 0.108 | 1.13 |
| Row 19 | 667 | 0.107 | 1.173 |
| Row 19 | 668 | 0.107 | 1.216 |
| Row 19 | 669 | 0.106 | 1.26 |
| Row 19 | 670 | 0.106 | 1.303 |
| Row 19 | 671 | 0.105 | 1.347 |
| Row 19 | 672 | 0.105 | 1.39 |
| Row 19 | 673 | 0.104 | 1.433 |
| Row 19 | 674 | 0.104 | 1.477 |
| Row 20 | 675 | 0.05 | −0.023 |
| Row 20 | 676 | 0.05 | 0.02 |
| Row 20 | 677 | 0.051 | 0.064 |
| Row 20 | 678 | 0.051 | 0.107 |
| Row 20 | 679 | 0.052 | 0.15 |
| Row 20 | 680 | 0.053 | 0.194 |
| Row 20 | 681 | 0.054 | 0.237 |
| Row 20 | 682 | 0.055 | 0.28 |
| Row 20 | 683 | 0.055 | 0.324 |
| Row 20 | 684 | 0.056 | 0.367 |
| Row 20 | 685 | 0.057 | 0.41 |
| Row 20 | 686 | 0.057 | 0.454 |
| Row 20 | 687 | 0.057 | 0.497 |
| Row 20 | 688 | 0.058 | 0.541 |
| Row 20 | 689 | 0.058 | 0.584 |
| Row 20 | 690 | 0.058 | 0.627 |
| Row 20 | 691 | 0.059 | 0.671 |
| Row 20 | 692 | 0.059 | 0.714 |
| Row 20 | 693 | 0.059 | 0.757 |
| Row 20 | 694 | 0.059 | 0.801 |
| Row 20 | 695 | 0.059 | 0.844 |
| Row 20 | 696 | 0.059 | 0.888 |
| Row 20 | 697 | 0.059 | 0.931 |
| Row 20 | 698 | 0.059 | 0.974 |
| Row 20 | 699 | 0.059 | 1.018 |
| Row 20 | 700 | 0.059 | 1.061 |
| Row 20 | 701 | 0.059 | 1.104 |
| Row 20 | 702 | 0.059 | 1.148 |
| Row 20 | 703 | 0.059 | 1.191 |
| Row 20 | 704 | 0.059 | 1.235 |
| Row 20 | 705 | 0.059 | 1.278 |
| Row 20 | 706 | 0.059 | 1.321 |
| Row 20 | 707 | 0.059 | 1.365 |
| Row 20 | 708 | 0.059 | 1.408 |
| Row 20 | 709 | 0.059 | 1.451 |
| Row 20 | 710 | 0.059 | 1.495 |
| Row 21 | 711 | 0 | 0 |
| Row 21 | 712 | 0 | 0.043 |
| Row 21 | 713 | 0.001 | 0.086 |
| Row 21 | 714 | 0.002 | 0.129 |
| Row 21 | 715 | 0.003 | 0.172 |
| Row 21 | 716 | 0.004 | 0.215 |
| Row 21 | 717 | 0.004 | 0.258 |
| Row 21 | 718 | 0.005 | 0.301 |
| Row 21 | 719 | 0.006 | 0.344 |
| Row 21 | 720 | 0.006 | 0.387 |
| Row 21 | 721 | 0.007 | 0.43 |
| Row 21 | 722 | 0.007 | 0.473 |
| Row 21 | 723 | 0.008 | 0.516 |
| Row 21 | 724 | 0.008 | 0.559 |
| Row 21 | 725 | 0.008 | 0.602 |
| Row 21 | 726 | 0.009 | 0.645 |
| Row 21 | 727 | 0.009 | 0.688 |
| Row 21 | 728 | 0.009 | 0.731 |
| Row 21 | 729 | 0.009 | 0.774 |
| Row 21 | 730 | 0.009 | 0.817 |
| Row 21 | 731 | 0.008 | 0.86 |
| Row 21 | 732 | 0.008 | 0.903 |
| Row 21 | 733 | 0.007 | 0.946 |
| Row 21 | 734 | 0.007 | 0.989 |
| Row 21 | 735 | 0.006 | 1.032 |
| Row 21 | 736 | 0.006 | 1.075 |
| Row 21 | 737 | 0.005 | 1.118 |
| Row 21 | 738 | 0.004 | 1.161 |
| Row 21 | 739 | 0.004 | 1.204 |
| Row 21 | 740 | 0.003 | 1.247 |
| Row 21 | 741 | 0.003 | 1.29 |
| Row 21 | 742 | 0.002 | 1.333 |
| Row 21 | 743 | 0.001 | 1.376 |
| Row 21 | 744 | 0.001 | 1.419 |
| Row 21 | 745 | 0 | 1.462 |

The X and Y coordinates for the holes illustrated in at least FIG. 6 and the values in Table 1 are distances given in inches from a point of origin O on the sheet 94, which is defined by reference numeral 100 in FIG. 6. In one embodiment, this point of origin is the center of hole 711 from Table 1. In one non-limiting embodiment and referring to FIG. 6 as well as Table 1, this point of origin may be 0.170 inches in the X direction from a corner 102 of the unformed sheet 94 illustrated in FIGS. 6 and 0.217 inches in the Y direction from the corner 102 of the unformed sheet 94 illustrated in FIG. 6. In other words, the corner 102 is −0.170 inches in the X direction and −0.217 inches in the Y direction from the point of origin 100 or the center of hole 711 in Table 1. It is, of course, understood that the holes 92 may be simply formed in an array as defined by the dimensions illustrated in Table 1 without reference to a corner 102 of the sheet. For example, the array 98 of holes can be defined in sheet 96 by using hole 711 as the point of origin and all of the coordinates in the X and Y direction are defined by the Cartesian coordinates of Table 1.

It is, of course, understood that other units of dimensions may be used for the dimensions in Table 1. The X and Y values mentioned above may in one embodiment have in average a manufacturing tolerance of about ±0.050 inches due to manufacturing and assembly tolerances. In yet another embodiment the X and Y values may have in average a manufacturing tolerance of about ±0.100 inches due to manufacturing and assembly tolerances. It is, of course, understood that ranges greater or less than the aforementioned ranges are considered to be within the scope of various embodiments of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine vane for a gas turbine engine having a plurality of cooling holes defined therein, at least some of the plurality of cooling holes being located on a leading edge of an airfoil of the turbine vane and in fluid communication with an internal cavity of the turbine vane; and
    a baffle insert located in the internal cavity, the baffle insert having a plurality of holes formed therein at least some of the plurality of holes of the baffle insert corresponding to the at least some of the plurality of cooling holes located in the leading edge of the turbine vane, the baffle insert being formed from a flat sheet of metal wherein the plurality of holes of the baffle insert are formed in the flat sheet of metal prior to the baffle insert being formed from the flat sheet of metal, the plurality of holes of the baffle insert being formed in the flat sheet of metal according to the coordinates of Table 1.

2. The turbine vane of claim 1, wherein the turbine vane is a first stage turbine vane of a high pressure turbine of the gas turbine engine.

3. The turbine vane of claim 2, wherein the at least some of the plurality of holes of the baffle insert corresponding to the at least some of the plurality of cooling holes located in the leading edge of the turbine vane have a hole diameter in a range of 0.015 inches to 0.030 inches.

4. The turbine vane of claim 3, wherein the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

5. The turbine vane of claim 1, wherein the at least some of the plurality of holes of the baffle insert corresponding to the at least some of the plurality of cooling holes located in the leading edge of the turbine vane have a hole diameter in a range of 0.015 inches to 0.030 inches.

6. The turbine vane of claim 5, wherein the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

7. The turbine vane of claim 1, wherein the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

8. A turbine stator assembly for a gas turbine engine comprising a plurality of vanes, each vane having a plurality of cooling holes defined therein, at least some of the plurality of cooling holes of each of the plurality of vanes being located on a leading edge of an airfoil of each of the plurality of vanes and in fluid communication with an internal cavity of a respective one of the plurality of vanes; and
    a baffle insert located in the internal cavity of each of the plurality of vanes, the baffle insert having a plurality of holes formed therein, at least some of the plurality of holes of the baffle insert corresponding to the at least some of the plurality of cooling holes located in the leading edge of a respective one of each of the plurality of vanes, the baffle insert being formed from a flat sheet of metal wherein the plurality of holes of the baffle insert are formed in the flat sheet of metal prior to the baffle insert being formed from the flat sheet of metal, the plurality of holes of the baffle insert being formed in the flat sheet of metal according to the coordinates of Table 1.

9. The turbine stator assembly of claim 8, wherein each vane of the plurality of vanes is a first stage vane of a high pressure turbine of the gas turbine engine.

10. The turbine stator assembly of claim 9, wherein the at least some of the plurality of holes of the baffle insert corresponding to the at least some of the plurality of cooling holes located in the leading edge of a respective one of the plurality of vanes have a hole diameter in a range of 0.015 inches to 0.030 inches.

11. The turbine stator assembly of claim 10, wherein the plurality of holes of the baffle insert other than the at least some of the plurality of holes of the baffle insert corresponding to the at least some of the plurality of cooling holes located in the leading edge of each vane of the plurality of vanes have a hole diameter that is less than the hole diameter of the at least some of the plurality of holes of the baffle insert corresponding to the at least some of the plurality of cooling holes located in the leading edge of the turbine vane.

12. The turbine stator assembly of claim 8, wherein the at least some of the plurality of holes of the baffle insert corresponding to the at least some of the plurality of cooling holes located in the leading edge of a respective one of the plurality of vanes have a hole diameter in a range of 0.015 inches to 0.030 inches.

13. The turbine stator assembly of claim 12, wherein the plurality of holes of the baffle insert other than the at least some of the plurality of holes of the baffle insert corresponding to the at least some of the plurality of cooling holes located in the leading edge of a respective one of the plurality of vanes have a hole diameter that is less than the hole diameter of the at least some of the plurality of holes of the baffle insert corresponding to the at least some of the plurality of cooling holes located in the leading edge of the turbine vane.

14. The turbine stator assembly of claim 8, wherein the plurality of holes of the baffle insert other than the at least some of the plurality of holes of the baffle insert corresponding to the at least some of the plurality of cooling holes located in the leading edge of a respective one of the plurality of vanes have a hole diameter that is less than the hole diameter of the at least some of the plurality of holes of the baffle insert corresponding to the at least some of the plurality of cooling holes located in the leading edge of the turbine vane.

15. A method of cooling a leading edge of a turbine vane of a gas turbine engine, comprising:

forming a plurality of cooling holes in the turbine vane, at least some of the plurality of cooling holes being located on a leading edge of an airfoil of the turbine vane and in fluid communication with an internal cavity of the turbine vane;

forming a baffle insert from a flat sheet of metal wherein a plurality of holes are formed in the flat sheet of metal prior to the baffle insert being formed from the flat sheet of metal, the plurality of holes of the baffle insert being formed in the flat sheet of metal according to the coordinates of Table 1; and inserting the formed baffle insert into the internal cavity of the turbine vane.

16. The method of claim 15, wherein at least some of the plurality of holes of the baffle insert correspond to the at least some of the plurality of cooling holes located in the leading edge of the turbine vane.

17. The method of claim 15, wherein the turbine vane is a first stage vane of a high pressure turbine of the gas turbine engine.

18. The method of claim 15, wherein the at least some of the plurality of holes of the baffle insert corresponding to the at least some of the plurality of cooling holes located in the leading edge of the turbine vane have a hole diameter in a range of 0.015 inches to 0.030 inches.

19. The method of claim 18, wherein the plurality of holes of the baffle insert other than the at least some of the plurality of holes of the baffle insert corresponding to the at least some of the plurality of cooling holes located in the leading edge of the turbine vane have a hole diameter that is less than the hole diameter of the at least some of the plurality of holes of the baffle insert corresponding to the at least some of the plurality of cooling holes located in the leading edge of the turbine vane.

20. The method of claim 15, wherein the turbine vane is a first stage vane of a high pressure turbine of the gas turbine engine, and wherein all of the plurality of holes of the baffle insert have a hole diameter in the range of 0.015 inches to 0.030 inches.

* * * * *